United States Patent [19]

Kim

[11] Patent Number: 5,296,918
[45] Date of Patent: Mar. 22, 1994

[54] MESSAGE OUTPUT APPARATUS FOR MULTI-PICTURES

[75] Inventor: Jae-Chul Kim, Suwon-shi, Rep. of Korea

[73] Assignee: Samsung Electronics Co., Ltd., Kyonggi-Do, Rep. of Korea

[21] Appl. No.: 903,285

[22] Filed: Jun. 24, 1992

[30] Foreign Application Priority Data

Jun. 24, 1991 [KR] Rep. of Korea .................. 91-10696

[51] Int. Cl.⁵ .................................... H04N 5/45
[52] U.S. Cl. ...................... 348/568; 248/578
[58] Field of Search ............... 358/183, 22; H04N 5/45

[56] References Cited

U.S. PATENT DOCUMENTS 4,746,983  5/1988  Hakamada ........................ 358/22
5,091,785  2/1992  Canfield et al. ................... 358/183

FOREIGN PATENT DOCUMENTS 61-99475  5/1986  Japan.
62-27308  2/1987  Japan.

Primary Examiner—Mark R. Powell
Attorney, Agent, or Firm—Sughrue, Mion, Zinn, Macpeak & Seas

[57] ABSTRACT

A multi-picture treatment apparatus which, can display several video signals on one screen, and which can compress input signals to be displayed on one screen in multi-pictures, and at the same time, can transmit external input messages to the multi-pictures so as to be displayed along with the pictorial images.

6 Claims, 2 Drawing Sheets

MESSAGE OUTPUT APPARATUS FOR MULTI-PICTURES

FIELD OF THE INVENTION

The present invention relates to a multi-picture treatment apparatus which can display multi-image signals on a single screen, and more particularly, to a message output apparatus for multi-pictures which can display multi-image signals as multi-pictures, and at the same time can overlap a message input over the multi-pictures for display.

BACKGROUND OF THE INVENTION

The conventional multi-picture treatment apparatuses have mainly centered on PIP (picture-in-picture) functions which display two segmentary pictures by inputting outside signals to the monitor, and Japanese Laid-Open Patent Application No. Sho 61(1986)-99475 entitled "Multi-Scanning Type Television Set" discloses a technique for a multi-scanning television set which, in addition to the receiving function of the conventional TV, allows for the horizontal frequency outputted from the converting apparatus and the like to increase the scanning lines by a factor of two in order to receive other video signals.

Furthermore, Japanese Laid-Open Utility Model Application No. Sho (1987)-27308 entitled "Camera for Multi-Screen" discloses a technique of forming a multi-screen which comprises several of camera tubes, photoelectric amplification means mounted on the respective camera tubes, an optical fiber cable with a sectional surface ratio of 4:3 connected to the photoelectric amplification means, and lens causing images to be projected on the surface of the optical fiber cable adjusted with the overall sectional surface ratio of 4:3.

However, in this kind of conventional PIP screen or multi-screen, there has existed drawbacks of not being able to display separate messages on the screen.

SUMMARY OF THE INVENTION

Accordingly, it is an object of the present invention to provide a message output apparatus for multi-pictures wherein input signals are compressed so as to be displayed in multi-pictures on a screen, and at the same time, external input messages are transmitted to the multi-picture screen so as to be displayed along with the pictures.

In accordance with the multi-picture treatment apparatus of the present invention, there is provided a message output circuit for multi-pictures, by which multi-pictures together with external input messages can be displayed on the multi-screens, the circuit comprising a signal input means for treating several internal image signals and external image signal inputs; a multi-signal compression means for compressing several input signals of the signal input means so as to output a video signal; a message overlapping means for mixing the compressed signal of the multi-signal compression means with external message signals, and to output the mixed signals; a signal output means for displaying the mixed signals of the message overlapping means on a screen; and an audio signal treatment means for selecting a necessary audio signal from the audio signals corresponding to the several input video signals for output.

BRIEF DESCRIPTION OF THE DRAWINGS

For a fuller understanding of the nature and objects of the present invention, reference should be made to the following detailed description taken in connection with the accompanying drawings in which.

DETAILED DESCRIPTION OF THE PREFERRED EMBODIMENT

Figure 1:
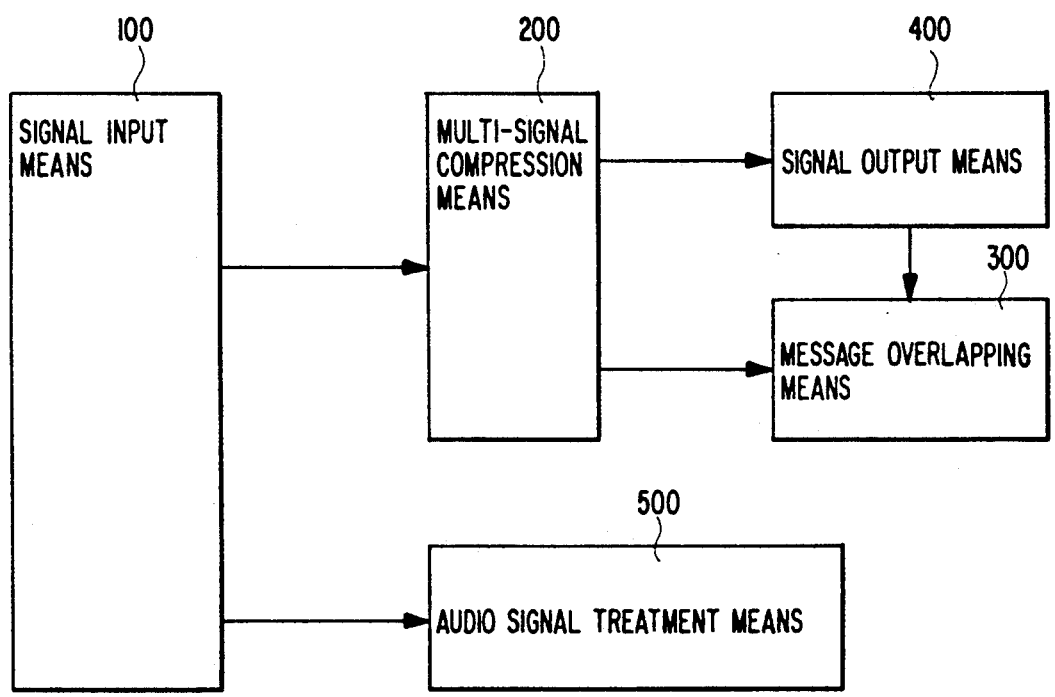
FIG. 1 is a block diagram of the message output apparatus for multi-pictures in accordance with the present invention.

FIG. 1 is a block diagram of a message output apparatus for multi-pictures in accordance with the present invention. As shown in FIG. 1, the apparatus includes a signal input means 100 for treating or processing several internal image signals and external image signal inputs; a multi-signal compression means 200 for compressing signals from the signal input means 100 and for outputting the compressed signals as a single video signal; a message overlapping means 300 for mixing compressed signals from the multi-signal compression means 200 with the external message signals and for outputting same; a signal output means 400 for displaying the output signals from the message overlapping means 300 on a screen; and an audio signal treatment means 500 for selecting the necessary audio signal from the audio signals corresponding to the several input video signals treated at the signal input means 100 for output.

Figure 2:
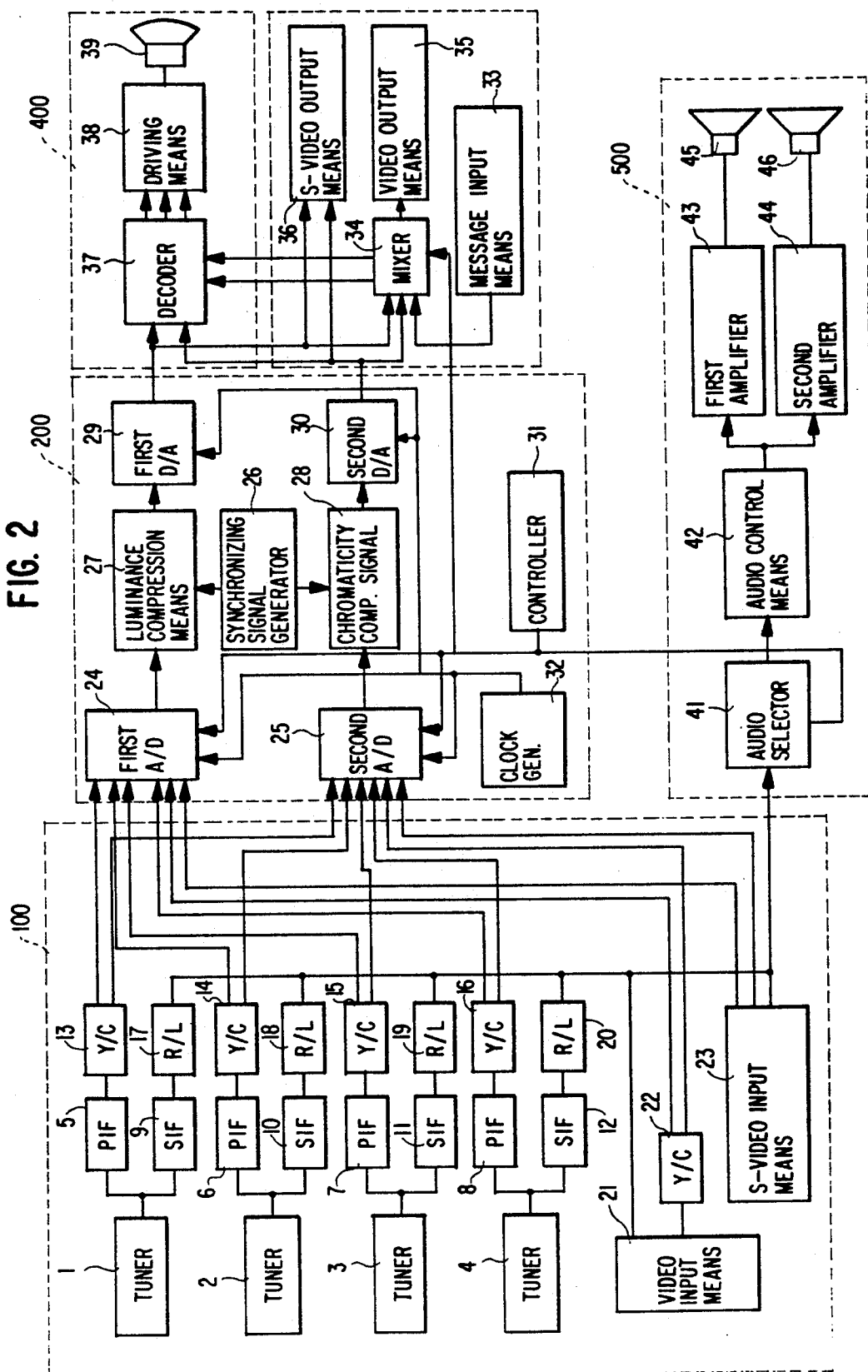
FIG. 2 is a detailed circuit diagram of the message output apparatus for multi-pictures in accordance with the present invention as illustrated in FIG. 1.

FIG. 2 is a detailed circuit diagram of the message output apparatus for multi-pictures as illustrated in FIG. 1 in accordance with the present invention.

In FIG. 2, signal input means 100 includes tuners 1–4 for selecting internal input signals; image or picture intermediate frequency (PIF) means 5–8 for detecting image IF signals from the signals selected from the tuners 1–4 for output; audio or sound IF means (SIF) 9–12 for detecting audio IF signals from the signals selected from the tuners 1–4 for output; Y/C separation means 13–16 for separating the luminance signals and chromaticity signals from the image signals outputted from the image IF means 5–8; impedance matching means 17–20 for impedance-matching audio signals outputted from the audio IF means 9–12; video input means 21 for inputting external composite image signals; Y/C separation means 22 for separating the inputted composite image signals of the video input means 21 into luminance signals and chromaticity signals; and S-video input means 23 for inputting super video signals separated into luminance signals and chromaticity signals.

The multi-signal compression means 200 includes a first A/D (Analog-to-Digital) converter 24 for converting the luminance signals outputted from the signal input means 100 to digital signals; a second A/D converter 25 for converting chromaticity signals outputted from the signal input means 100 to digital signals; luminance compression means 27 for inserting the synchronizing signals generated from the synchronizing signal generator 26 into digitalized luminance signals outputted from the first A/D converter 24 for compression; chromaticity compression means 28 for inserting synchronizing signals generated from the synchronizing signal generator 26 into the digitalized chromaticity signals outputted from the second A/D converter 25 for compression; and first and second D/A converters 29, 30 for converting the outputs of the luminance and chromaticity compression means 27, 28, respectively, into analog signals.

The first and second A/D converters 24, 25 are controlled by a controller 31 which converts the analog signals to digital signals, and the first and second A/D converters 24, 25, and the first and second D/A converters 29, 30 use the same clock generated from the clock generator 32 for obtaining the same signals.

The message overlapping means 300 includes a mixer 34 for mixing the luminance and chromaticity signals wherein synchronizing signal are inserted and compressed at the multi-compression means 200 with the message signals applied through the message input means 33; a video output means 35 for outputting for tele-recording composite video blacking signals in which messages are mixed at the mixer 34; and S-video output means 36 for outputting for tele-recording luminance and chromaticity signals, wherein synchronizing signals are inserted and compressed at the multi-signal compression means 200.

The signal output means 400 includes a decoder 37 for decoding the signals from the mixer 34 and the output of the multi-signal compression means 200; and a driving means 38 for driving a CRT 39 in accordance with the output of the decoder 37 for displaying the video images.

An audio signal treatment means 500 includes an audio selector 41 for selecting necessary audio signals from the audio signals outputted from the signal input means 100, an audio controller 42 for controlling the audio signals selectively outputted from the audio selector 41, first and second amplifiers 43, 44 for amplifying audio signals output from the audio controller 42, and speakers 45, 46 for receiving the outputs from the first and second amplifiers 43 and 44, respectively.

A detailed explanation of the operation of the message output apparatus for multi-pictures in accordance with the present invention will now be provided.

The tuners 1-4 of signal input means 100 output respective RF signals by tuning RF signals received from an antenna.

At this moment, the selection of tuners 1-4 and the supply of tuning voltages are equal to a monitor using one tuner however, respective broadcasting signals are selected utilizing several tuners (four tuners in the present embodiment).

The signals selected at tuners 1-4 are provided to image IF means 5-8 and audio IF means 9-12 which serve to detect image and audio signals.

The image signals detected at the image IF means 5-8 are applied to Y/C separation means 13-16 where the image signals are divided into luminance and chromaticity signals, and then luminance signals are applied to the first A/D converter 24 of the multi-signal compression means 200, while chromaticity signals are inputted to the second A/D converter 25.

Furthermore, the audio signals detected from audio IF means 9-12 are impedance-matched at impedance matching means, and then inputted to the audio selector 41 of the audio signal treatment means 500.

The external composite video signals being inputted through the video input means 21 are divided into luminance and chromaticity signals at the Y/C separation means 22 and thereafter respectively inputted to the first and second A/D converters 24, 25 of the multi-signal compression means 200.

The external luminance and chromaticity signals being inputted through the S-video input means 23 are directly applied to multi-signal compression means 200, and audio signals from the S-video input means 23 are inputted to the audio selector 41 of the audio signal treatment means 500.

Accordingly, several internal and external input signals are provided to the first and second A/D converters 24, 25 of the multi-signal compression means 200 and the first and second A/D converters 24, 25 respectively convert analog input signals to digital signals in accordance with the clock signals generated from clock generator 32.

In other words, the first A/D converter 24 converts the luminance signals to digital signals and the second A/D converter 25 converts the chromaticity signals to digital signals.

The output of the first and second A/D converters 24, 25 are then selected in accordance with the controller 31 and the digital signals of the first and second A/D converters 24, 25, selectively outputted by the controller 31, are respectively inputted to luminance and chromaticity compression means 27, 28.

At the luminance and chromaticity compression means 27, 28, multi-frame signals for checking how many signals are inputted and frame signals for checking the initial start point are provided for compression, and synchronizing signals generated from the synchronizing signal generator 26 are caused to be inserted in the compression signals.

As described above, the compressed signals into which synchronizing signals are inserted at luminance and chromaticity compression means 27, 28 are inputted into first and second D-A converters 29, 30 and converted into analog signals thereafter, and then inputted to the mixer 34 of the message overlapping means 300 and to the decoder 37 of the signal output means 400.

The clock signals applied to the first and second A/D converters 24, 25 and the first and second D-A converters 29, 30 obtain the same signals by applying the same clock signals generated from the clock generator 32.

In the meantime, the message signals inputted into the message input means 33 of the message overlapping means 300 are inputted to R (RED), G (GREEN) B (BLUE) signals by the user and then inputted to the mixer 34.

At this moment, the message signals are inputted to the mixer 34 and at the same time, the analog signals converted from the first and second D-A converters 29, 30 and control signals of controller 31 are applied.

The mixer 34, in accordance with a control signal from the controller 31, overlaps (mixes) the luminance and chromaticity signals of the first and second D-A converters 29, 30 with the message signals inputted via the message input means 30, and the overlapped (mixed) signals are inputted to decoder 37 of the signal output means 400.

At this moment, the decoder 37 is either applied with the signals wherein the messages are overlapped at the mixer 34 by the control signals of the controller 31 or are applied with analog luminance and chromaticity signals from the first and second D/A converters 29, 30.

The luminance and chromaticity signals outputted from the mixer 34 or from the first and second D-A converters 29, 30 are decoded at the decoder 37 and are the decoded signals applied to the driving means 38 which drives CRT 39, thereby causing video images to be displayed.

Meanwhile, the luminance and chromaticity signals from the first and second D/A converters 29, 30 are provided as external outputs through the S-video output 36 of the message overlapping means 300 for possible use for tele-recording, and the composite image signals wherein message signals are overlapped at the mixer 34 are provided as external signals through the video output means 35 for possible use for tele-recording.

Furthermore, the audio signals detected at the audio SIF means 9-12 of the signal input means 100 are impedance-matched at the impedance matching means 17-20, and thereafter are inputted to the audio selector 41 of the audio signal treatment means 500, and the audio selector 41 selects the necessary audio signals from the audio signals outputted from the impedance matching means 17-20 in accordance with output control signals from the controller 31.

The audio control means 42 controls the base, treble, volume and the like selectively outputted from the audio selector 41, and applies its output to the first and second amplifiers 43, 44, where the signals are first amplified and then outputted to speakers 45, 46.

Accordingly, the message output apparatus for multi-pictures in accordance with the present invention can display several video signals on one monitor in multi-pictures, and simultaneously, can display externally-applied input messages.

What is claimed is:

1. A message output apparatus for multi-pictures comprising:
   a signal input means for processing external image signal inputs and internal image signals;
   multi-signal compression means for compressing outputs from said signal input means, and for outputting the compressed signals;
   message overlapping means for overlapping message signals with compressed signals provided by said multi-signal compression means, said message overlapping means including message input means for inputting the message signals;
   signal outputting means for displaying output signals from said message overlapping means on a single screen; and
   an audio signal treatment means for selectively outputting audio signals from the image signals of said signal input means.

2. A message output apparatus for multi-pictures comprising:
   a signal input means for processing external image signal inputs and internal image signals;
   multi-signal compression means for compressing outputs from said signal input means, and for outputting the compressed signals;
   message overlapping means for overlapping message signals with compressed signals provided by said multi-signal compression means;
   signal outputting means for displaying output signals from said message overlapping means on a single screen; and
   an audio signal treatment means for selectively outputting audio signals from the image signals of said signal input means, wherein said signal input means comprises:
      a plurality of tuners for selecting the internal input signals;
      image IF means for detecting image IF signals from the signals selected from said tuners;
      audio IF means for detecting audio IF signals from the signals selected from said tuners;
      Y/C separation means for separating luminance and chromaticity signals from the image signals outputted by said image IF means;
      impedance matching means for impedance-matching audio signals outputted from said audio IF means;
      video input means for inputting external composite image signals;
      Y/C separation means for separating the external composite image signals from said video input means into luminance and chromaticity signals; and
      input means for inputting video signals and for outputting luminance and chromaticity signals.

3. A message output apparatus for multi-pictures comprising:
   a signal input means for processing external image signal inputs and internal image signals;
   multi-signal compression means for compressing outputs from said signal input means, and for outputting the compressed signals;
   message overlapping means for overlapping message signals with compressed signals provided by said multi-signal compression means,
   signal outputting means for displaying output signals from said message overlapping means on a single screen; and
   an audio signal treatment means for selectively outputting audio signals from the image signals of said signal input means, wherein said multi-signal compression means comprises:
      a first A/D converter for converting analog luminance signals outputted from said signal input means to digital signals;
      a second A/D converter for converting analog chromaticity signals outputted from said signal input means to digital signals;
      a synchronizing signal generator for generating synchronizing signals;
      luminance compression means for inserting the synchronizing signals generated from said synchronizing signal generator into the digital luminance signals outputted from said first A/D converter;
      chromaticity compression means for inserting the synchronizing signals generated from said synchronizing signal generator into digital chromaticity signals outputted from said second A/D converter; and
      first and second D/A converters for respectively converting outputs from said luminance and chromaticity compression means into analog signals.

4. A message output apparatus for multi-pictures comprising:
   a signal input means for processing external image signal inputs and internal image signals;
   multi-signal compression means for compressing outputs from said signal input means, and for outputting the compressed signals;
   message overlapping means for overlapping message signals with compressed signals provided by said multi-signal compression means,
   signal outputting means for displaying output signals from said message overlapping means on a single screen; and an audio signal treatment means for selectively outputting audio signals from the image signals of said signal input means, wherein said message overlapping means comprises:

message input means for inputting message signals, said multi-signal compression means operable for providing compressed luminance and chromaticity signals having synchronizing signals inserted therein;

a mixer for mixing the message signal inputted through said message input means with output signals from said multi-signal compression means;

a video output means for outputting the mixed image signals from said mixer for tele-recording; and output means for outputting output signals from said multi-signal compression means for tele-recording.

5. A message output apparatus for multi-pictures as defined in claim 1, wherein said signal output means comprises:

a decoder for decoding an output of said multi-signal compression means and an output of said message overlapping means;

a CRT; and a driving means for driving said CRT so as to display video images in accordance with said decoder.

6. A message output apparatus for multi-pictures as defined in claim 3, further comprising a clock generator for generating a clock signal, and wherein the first and second A/D converters and the first and second D/A converters use the clock signal generated from the block generator.

* * * * *